Oct. 27, 1964    W. MUELLER    3,154,342
MOTORCYCLE FAIRING
Filed Dec. 28, 1962    2 Sheets-Sheet 1
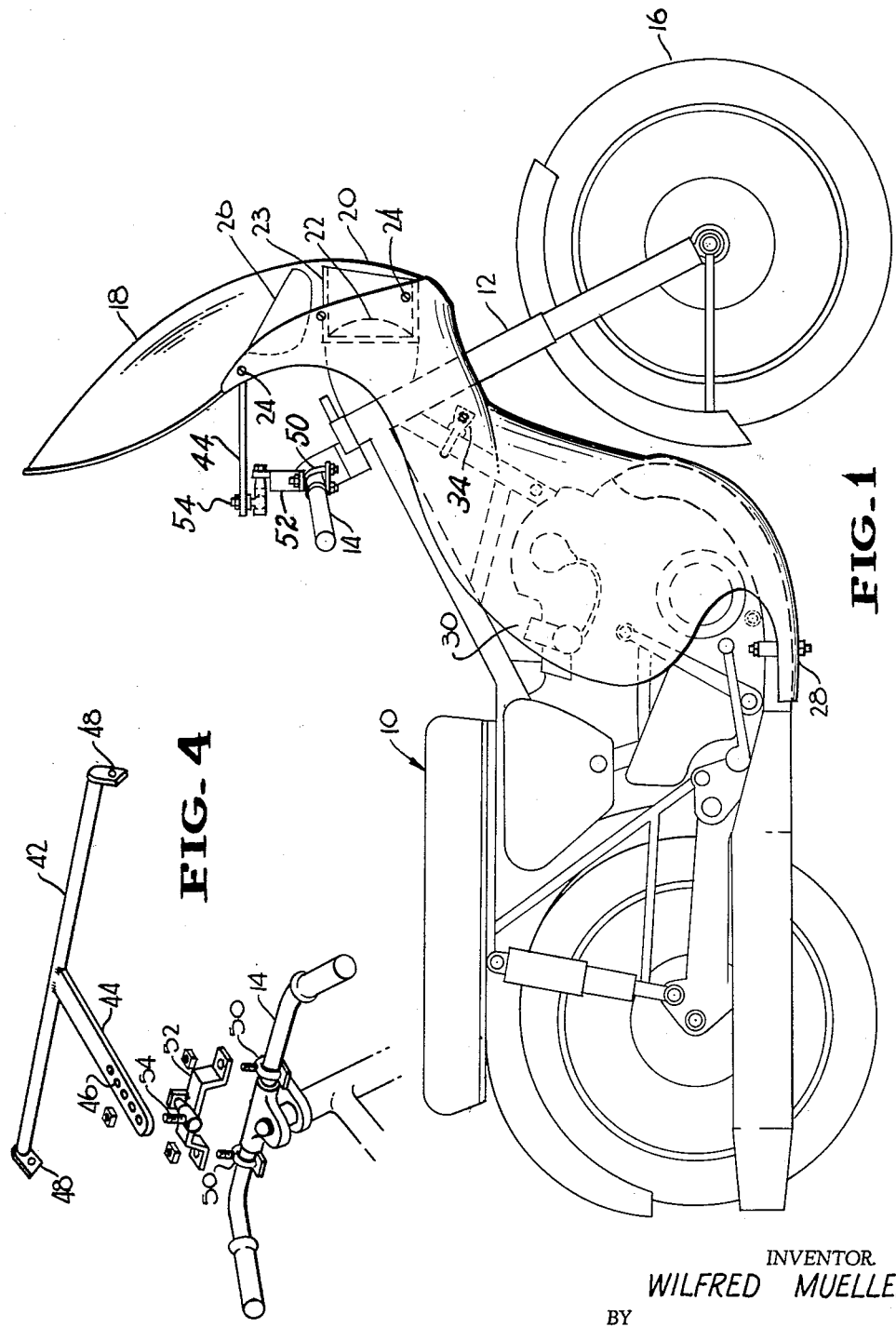
INVENTOR.
WILFRED MUELLER
BY
Eckhoff & Slick
ATTORNEYS Oct. 27, 1964 W. MUELLER 3,154,342
MOTORCYCLE FAIRING
Filed Dec. 28, 1962 2 Sheets-Sheet 2
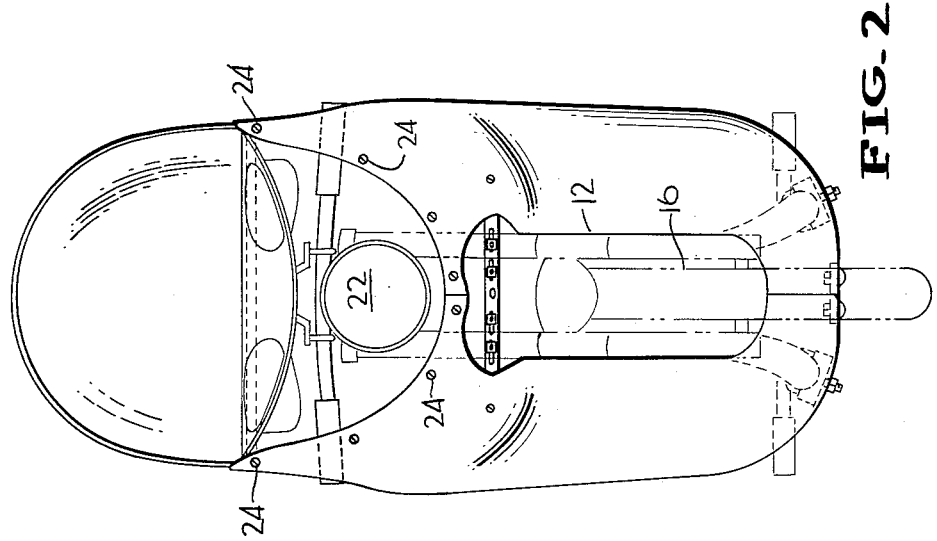
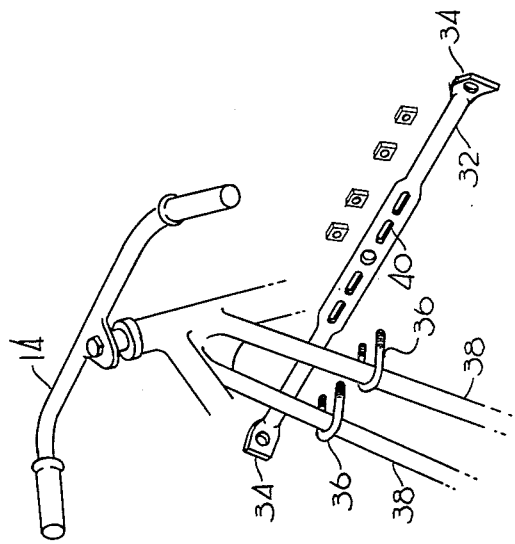
INVENTOR.
WILFRED MUELLER
BY
*Eckhoff & Slick*
ATTORNEYS

United States Patent Office 3,154,342
Patented Oct. 27, 1964

3,154,342
MOTORCYCLE FAIRING
Wilfred Mueller, Hayward, Calif., assignor to Eckhoff and Slick, San Francisco, Calif., a partnership
Filed Dec. 28, 1962, Ser. No. 247,889
4 Claims. (Cl. 296—78.1)

This invention relates in general to a motorcycle fairing and more particularly to a motorcycle fairing which can be used with a wide variety of motorcycles.

Motorcycle fairings or racing shells have been used for many years but generally fail to take into consideration the need for headlamps or the need for protection from wind and rain while riding in an upright position. On the other hand, touring windscreens have often been constructed without thought of aerodynamic principles and like the aforementioned racing shells are generally rather difficult to install and often are designed only for a single make of motorcycle.

It is an object of this invention to provide a motorcycle fairing which combines the virtues of both those used for racing and those intended primarily for touring and which is readily attached.

It is a further object of this invention to provide a motorcycle fairing which, because of its construction and the mounting brackets used with it, can be used with many makes of motorcycles.

Still another object of this invention is to provide a motorcycle fairing which may be mounted in front of the headlamp of a motorcycle but which still permits use of the headlamp while also providing means for preventing glare from the headlamp from being transmitted to the eyes of the rider.

Other objects and advantages of this invention, if not specifically set forth, will become apparent during the course of the description which follows.

In the drawings:

FIGURE 1 is a side elevation of a motorcycle with the fairing of this invention installed.

FIGURE 2 is a front elevation showing the fairing mounted on a motorcycle.

FIGURE 3 is a fragmentary perspective showing a portion of a bracket for mounting the fairing on a motorcycle.

FIGURE 4 is a fragmentary perspective showing the bracket used to support the uppermost portion of the fairing.

Generally, this invention comprises a motorcycle fairing having a transparent screen extending above the handlebars of the motorcycle to protect the face of the rider from wind and rain. A downward extension of this screen passes between the frame of the motorcycle and the front wheel and has a slot or keyhole therein through which the fork which supports the front wheel extends. The lowermost portion of the fairing extends back toward the rear of the vehicle and outwardly sufficiently to partially surround the rider's legs. Universal-type brackets secure the fairing to various makes of motorcycles. A single bracket is secured to the motorcycle frame toward the middle of the fairing and a second bracket supports and braces the uppermost portion of the wind screen, this bracket being secured to the handlebars of the motorcycle and having a swivel between the point of connection to the handlebars and to the fairing so as to permit relative movement between the fairing and the handlebars.

Referring now to the drawings wherein like characters refer to like parts throughout, there is shown a motorcycle 10 of standard construction having a front wheel fork 12 to the upper end of which is secured the handlebars 14 and to the lower end of which is mounted the front wheel 16. As seen in FIGURE 1, the fairing is generally in the shape of an inverted S but with an additional reverse extension at the bottom so as to extend beneath the feet of the rider and provide additional streamlining. The fairing incorporates a rigid, shallow bowl-shaped Plexiglass shield 18 which presents a smooth convex surface to the air against which it pushes. The lowermost section 20 is also transparent and fits directly in front of the headlight 22 of the motorcycle. A ring 23 surrounds the headlamp so as to direct the light forwardly only. The Plexiglass section is bolted or riveted at 24 to the lower, opaque Fiberglas portion of the fairing. The arrangement shown permits the headlamp to be retained in its normal position on the motorcycle and it need not be removed or relocated when the fairing is mounted. Reflection glare from the lamp is eliminated by an opaque tray 26 which is held in place by bolts 24 and extends more or less downwardly directly over the headlamp. The tray provides a convenient carrying place for cigarettes, gloves, etc. As may be seen in front view FIGURE 2, the lowermost Fiberglas section is provided with a large slot or keyhole through which the fork 12 extends. The fairing fits tightly back against the frame of the motorcycle and permits steering without interference.

In the area designated 28, the fairing is curved beneath the rider's feet while ears 30 also provide protection and streamlining to increase rider comfort together with speed and fuel economy.

In FIGURES 3 and 4, the universal mounting brackets are shown. Cross bar 32 is secured at the ears 34 to the middle or lower portion of the unit. One or more additional brackets might be used beneath this if needed. U-bolts 36 slip around the frame bars 38 of the motorcycle and fit into one or another of the elongated slots 40 of the bracket 32. At the upper end, means are provided for supporting and bracing the fairing on the handlebars yet permitting relative movement between the handlebars and the shell. As shown in FIGURE 4, a generally T-shaped bracket consisting of cross bar 42 and tongue 44 having a plurality of holes 46 therein is secured by means of ears 48 to the uppermost portion of the fairing, preferably by means of the two uppermost bolts 24 which also help to hold the Plexiglass and Fiberglas sections together. The U-bolt assemblies 50 together with a generally U-shaped bracket 52 having a pin 54 on the uppermost portion thereof hold the tongue 44 in place directly over the handlebars. Tongue 44 is permitted to pivot relative to pin 54 but it will be understood that adequate resistance to deformation of the Plexiglass shield from wind pressure is nevertheless provided together with a certain amount of support for the entire unit.

As noted, the unit is designed for more or less universal mounting and the slot should be large enough to accommodate the front wheel forks of most standard motorcycles. The unit may be supplied in three pieces plus brackets. In this event, Plexiglas shields 18 and the two halves of the Fiberglas shell are properly positioned and the brackets secured and adjusted as required. Alternatively, the shell portion may be supplied in one piece with the slot being large enough to permit the front wheel, fender and fork to slip through.

Obviously, many modifications and variations of this invention may be made without departing from the spirit and scope hereof, and therefore only such limitations should be imposed as are indicated in the appended claims.

I claim:

1. In combination, a motorcycle having a centrally mounted headlamp and a motorcycle fairing, said fairing comprising:
 (a) an uppermost portion consisting of a transparent screen extending above the handlebars of a motorcycle to protect the face of a rider;
 (b) a downward extension from said screen, said downward extension passing between the frame and the front wheel of the motorcycle and having a slot therein of sufficient width to permit the fork supporting the front wheel of the motorcycle to pass therethrough, said downward extension being mounted sufficiently behind the front wheel of the said motorcycle to permit said motorcycle to be steered without interference from said extension;

(c) means securing said fairing to said motorcycle, said means comprising at least a single bracket secured to the frame of said motorcycle and said fairing at a point below the level of the handlebars of said motorcycle;

(d) and additional means securing said fairing to said motorcycle comprising a generally T-shaped bracket secured at one point at the bottom of said T-shaped bracket to the handlebars of said motorcycle and at the ends of the cross member of said T-shaped bracket to the uppermost portion of said fairing, the said bracket having a swivel located substantially in line with the axis of the fork of said motorcycle and between the points of connection to said handlebars and to said fairing to permit relative movement between said fairing and said handlebars;

(e) the uppermost portion of said fairing being clear Plexiglas and extending sufficiently low to extend beneath the level of the headlight of the said motorcycle whereby to avoid obstructing the said headlight, the said downward extension comprising a generally S-shaped Fiberglas screen having a pair of ears which extend around the front and sides of the legs of a rider on the said motorcycle.

2. In combination, a motorcycle having a centrally mounted headlamp and a motorcycle fairing, said fairing comprising:

(a) an uppermost portion consisting of a transparent screen extending above the handlebars of a motorcycle to protect the face of a rider;

(b) a downward extension from said screen, said downward extension passing between the frame and the front wheel of the motorcycle and having a slot therein of sufficient width to permit the fork supporting the front wheel of the motorcycle to pass therethrough, said downward extension being mounted sufficiently behind the front wheel of the said motorcycle to permit said motorcycle to be steered without interference from said extension;

(c) means securing said fairing to said motorcycle, said means comprising at least a single bracket secured to the frame of said motorcycle and said fairing at a point below the level of the handlebars of said motorcycle;

(d) and additional means securing said fairing to said motorcycle comprising a generally T-shaped bracket secured at one point at the bottom of said T-shaped bracket to the handlebars of said motorcycle and at the ends of the cross member of said T-shaped bracket to the uppermost portion of said fairing, the said bracket having a swivel located substantially in line with the axis of the fork of said motorcycle and between the points of connection to said handlebars and to said fairing to permit relative movement between said fairing and said handlebars;

(e) said uppermost portion being a generally oval-shape Plexiglas screen extending to about the level of the eyes of a rider on the said motorcycle and beneath the level of the headlamp of the said motorcycle;

(f) and a shelf secured to the said Plexiglas screen directly above the said headlamp of the said motorcycle, said shelf being generally horizontal and being of sufficient size to block a glare of light from the said headlight.

3. A motorcycle fairing comprising:

(a) a transparent convex screen of a generally oval shape;

(b) a downward extension from said screen, said downward extension having a slot therein of sufficient width to permit the fork supporting the front wheel of a motorcycle to pass therethrough, said downward extension being composed of two parallel legs each secured to said oval screen on an opposite side thereof and extending generally at an angle to the said screen;

(c) means immediately adjacent said oval screen for holding together the edges of the legs secured to said screen and means for securing the legs to a motorcycle at the distal ends thereof;

(d) means for securing said fairing to a motorcycle, said means comprising at least a single bracket adapted to be secured to the frame of a motorcycle and secured to at least one of the said legs;

(e) and additional means for securing said fairing to said motorcycle, said means comprising a generally T-shaped bracket secured at the ends of the cross member of said T-shaped bracket to either leg at points immediately adjacent the points where said legs are secured to said screen, said bracket having a swivel connection at one end thereof for connection to the handlebars of a motorcycle at a point substantially in line with the axis of the fork of said motorcycle.

4. A motorcycle fairing comprising:

(a) a transparent convex screen;

(b) a downward extension from said screen, said downward extension having a slot therein of sufficient width to permit the fork supporting the front wheel of a motorcycle to pass therethrough, said downward extension being secured to the said screen, said slot defining legs extending generally at an angle to said screen;

(c) bracket means for securing said legs to the said motorcycle at points adjacent the distal ends of the said legs; and (d) an additional means for securing said fairing to said motorcycle, said means comprising a generally T-shaped bracket secured at the ends of the cross member of said T-shaped bracket to said downward extension at points adjacent the upper portion thereof, said bracket having a swivel connection at one end thereof for connection to the handlebars of a motorcycle at a point substantially in line with the axis of the fork of said motorcycle.

References Cited in the file of this patent

UNITED STATES PATENTS 1,188,105    Schlegel _____ June 20, 1916

FOREIGN PATENTS 143,469    Great Britain _____ May 27, 1920
154,158    Austria _____ Sept. 10, 1938
1,023,354    Germany _____ Jan. 23, 1958
1,171,618    France _____ Oct. 6, 1958